Patented Apr. 26, 1938

2,115,508

UNITED STATES PATENT OFFICE 2,115,508

DYESTUFF SULPHONIC ACIDS OF THE DIOXAZINE SERIES AND A PROCESS OF PREPARING THEM

Heinrich Greune and Max Thiele, Frankfort-on-the-Main, Germany, assignors to General Aniline Works, Inc., New York, N. Y., a corporation of Delaware No Drawing. Application July 15, 1935, Serial No. 31,526. In Germany July 27, 1934

1 Claim. (Cl. 260—28)

The present invention relates to dyestuff-sulphonic acids of the dioxazine series and to a process of preparing them.

We have found that valuable dyestuff-sulphonic acids are obtainable by treating in the absence of an organic solvent a 1,4-benzoquinone derivative, containing sulpho-groups, of the following formula:

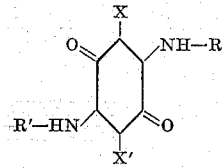

wherein R and R' stand for a sulphonated monovalent radical containing three nuclei and X and X' for hydrogen, alkyl, aryl or halogen, with an acid condensing agent such as sulphuric acid, chloro-sulphonic acid, fuming sulphuric acid or an alkaline condensing agent such as ammonia, sodium carbonate, caustic soda solution or the like, preferably in the presence of an organic or inorganic oxidizing agent, such as chloranil, benzoquinone, pyrolusite, permanganate, lead peroxide, hydrogen peroxide or the like.

Sulphonated monovalent radicals containing three nuclei, which are suitable for the process of the present invention, are for instance those of carbazole, diphenylene-oxide, diphenylene-dioxide, acenaphthene, fluorene, anthracene, phenanthrene, phenanthridone.

The 1,4-benzoquinone derivatives of the above formula, used as parent materials, may be made, for instance, by causing chloranil or another 1,4-benzoquinone to react with amino-sulphonic acids of the above mentioned compounds containing three nuclei.

The condensation products which are obtainable from the said 1,4-benzoquinone derivatives by the process of this invention may be regarded as dioxazine-sulphonic acids and dye the animal and vegetable fiber as well as mixed fabrics very fast tints.

The following examples serve to illustrate the invention, but they are not intended to limit it thereto; the parts are by weight:

1. 100 parts of 2,5-di-(N-ethylcarbazolyl-3'-amino-6'-sulphonic acid)-3,6-dichloro-1,4-benzoquinone of the formula:

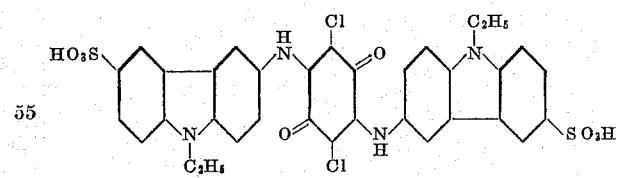

made, for instance, by causing chloranil to react with 3-amino-(N)-ethylcarbazole-6-sulphonic acid in alcohol or aqueous alcohol in the presence of an acid binding agent, are introduced at about 60° C. to about 70° C. into 2000 parts of concentrated sulphuric acid and the mixture is heated for several hours, for instance, about 2 to 5 hours, at about 90° C. to about 100° C. The solution is allowed to cool and then poured into ice-water; the precipitated dyestuff-sulphonic acid is filtered, washed with a sodium chloride solution until neutral and dried. The dyestuff thus produced dyes animal, vegetable and viscose artificial fiber as well as mixed fabrics, fast clear blue tints. For the formation of the dyestuff there may be used chlorosulphonic acid instead of concentrated sulphuric acid.

2. 58 parts of 2,5-di-(N-methylcarbazolyl-3'-amino-6'-sulphonic acid)-3,6-dichloro-1,4-benzoquinone, made, for instance, by causing chloranil to react with 3-amino-(N)-methylcarbazole-6-sulphonic acid in alcohol or aqueous alcohol in the presence of an acid-binding agent, are dissolved at ordinary temperature in 1000 parts of concentrated sulphuric acid; 40 parts of pyrolusite are added and mixed with the solution while stirring. After the reaction is complete the mixture is poured into ice-water; the precipitated dyestuff-sulphonic acid is filtered, washed until neutral and dried. The dyeings obtained with it are similar to those of the dyestuff made according to the preceding example.

3. 87 parts of 2,5-di-(N-ethylcarbazolyl-3'-amino-6'-sulphonic acid)-3,6-dichloro-1,4-benzoquinone, made, for instance, by causing chloranil to react with 3-amino-(N)-ethylcarbazole-6-sulphonic acid in alcohol or aqueous alcohol in the presence of an acid-binding agent, are dissolved in 1000 parts of water. The brown solution is mixed with 14 parts of concentrated caustic soda solution; 63 parts of potassium permanganate in a solid form or in a dissolved state are added and the mixture is stirred for some time until a test sample dissolved in water appears pure blue. The mass is freed from manganese dioxide by filtration and the manganese dioxide is washed on the filter with hot water. The sulphonic acid is precipitated by adding common salt to the combined filtrates thus obtained; it is filtered, washed and dried. The dyeings obtained with it are similar to those obtained with the dyestuff obtainable as prescribed in Example 1.

4. 100 parts of 2,5-di-(carbazolyl-3'-amino-4'-sulphonic acid)-3,6-dichloro-1,4-benzoquinone, obtainable, for instance by causing chloranil to react with 3-aminocarbazole-4-sulphonic acid in aqueous alcohol, are introduced at about 70° C. to about 80° C. into 2000 parts of sulphuric acid monohydrate and the mixture is heated for several hours, for instance, 2 to 5 hours, at about 110° C. to about 120° C. The sulphuric acid solution is then poured on ice, the precipitated dyestuff is filtered, washed with a sodium chloride solution until neutral and dried. It is a sulphonic acid which is soluble in water to a blue solution and dyes animal, vegetable and viscose artificial fiber, as well as mixed fabrics, beautiful blue tints of very good fastness to light.

5. 50 parts of 2,5-di-(fluorenyl-2'-amino-disulphonic acid)-3,6-dichloro-1.4-benzoquinone, obtainable, for instance, by causing chloranil to react with sodium-2-aminofluorene-disulphonate in an aqueous solution in the presence of sodium acetate, are dissolved in 1500 parts of sulphuric acid monohydrate and 50 parts of pyrolusite are added at 20° C., while cooling. After stirring for 2 hours at 20° C. the reaction mass is poured on ice, the precipitated dyestuff sulphonic acid is filtered, the solid matter is washed with sodium chloride solution until neutral and dried. The dyestuff dyes cotton and viscose artificial silk clear violet tints of good properties of fastness.

6. 50 parts of 2,5-di-(2'-aminodiphenylenoxide-6'-sulphonic acid)-3,6-dichloro-1.4-benzoquinone, obtainable, for instance, by causing chloranil to react with sodium-2-aminodiphenylene-oxide-6-sulphonate in aqueous alcohol with addition of an acid binding agent, are introduced into 1500 parts of sulphuric acid monohydrate and the whole is heated for ¼ hour at 150° C. The cooled reaction mass is poured on ice, the whole is filtered with suction, the solid matter is washed with a sodium chloride solution until neutral and dried. The dyestuff sulphonic acid obtained dyes cotton and viscose artificial silk bluish-red tints which are distinguished by good properties of fastness.

In the above examples there may also be used such compounds as starting materials, for the preparation of which there has been used, instead of chloranil, other 1,4-benzoquinones such as 1,4-benzoquinone itself, toluquinone or the like.

We claim:

The dyestuff of the dioxazine series substantially identical with that obtainable by the process which comprises heating for several hours at a temperature of about 110° C. to about 120° C. 2,5-di-(carbazolyl-3'-amino-4'-sulphonic acid)-3,6-dichloro-1,4-benzoquinone with sulphuric acid monohydrate.

HEINRICH GREUNE.
MAX THIELE.